April 28, 1925.  1,535,921

C. LAMPRE

SHOCK ABSORBER

Filed Aug. 25, 1922    2 Sheets-Sheet 1

C. Lampre
INVENTOR

BY Victor J. Evans
ATTORNEY

WITNESS:

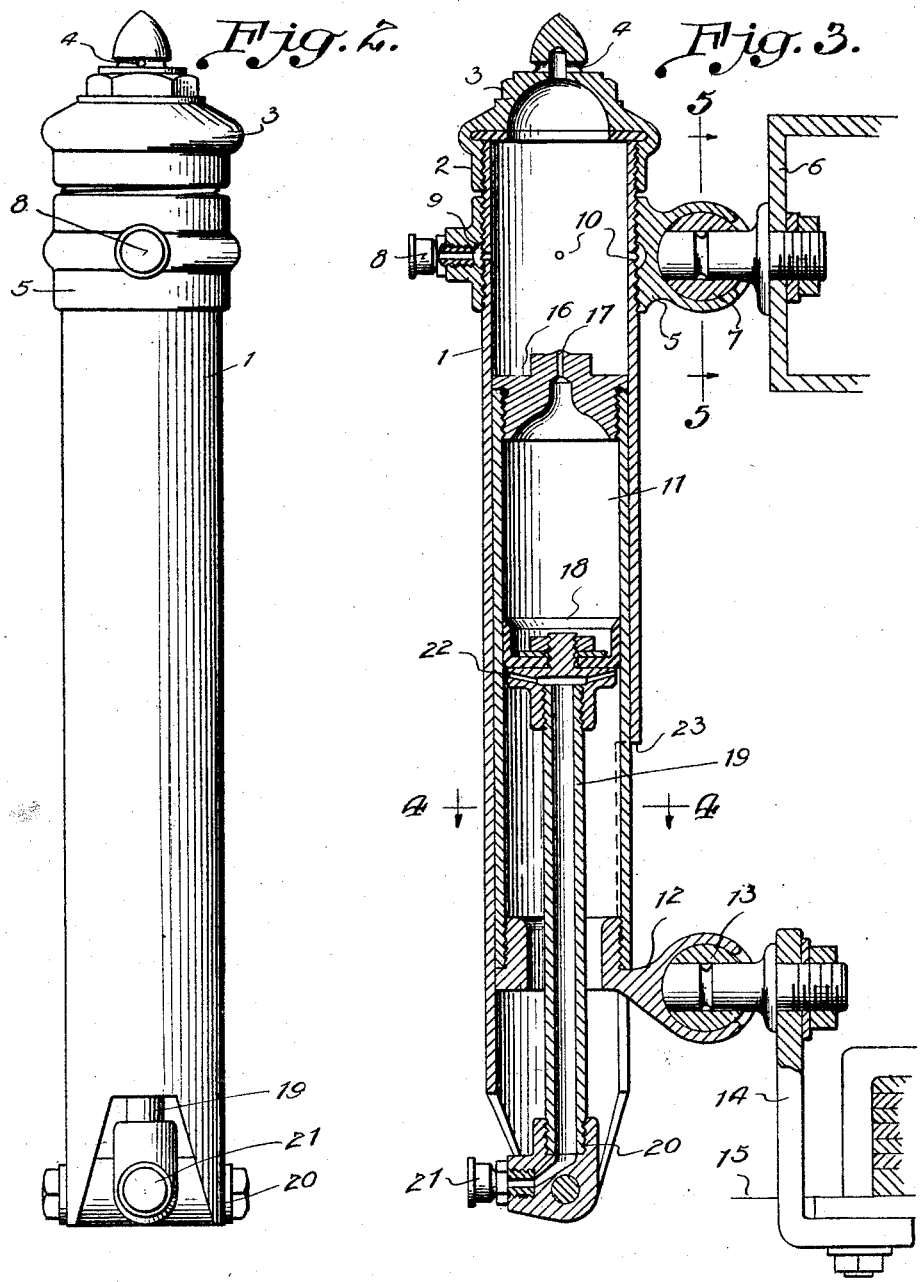

Patented Apr. 28, 1925.

1,535,921

UNITED STATES PATENT OFFICE.

CELESTIN LAMPRE, OF ELYRIA, OHIO.

SHOCK ABSORBER.

Application filed August 25, 1922. Serial No. 584,316.

*To all whom it may concern:*

Be it known that I, CELESTIN LAMPRE, a citizen of the United States, residing at Elyria, in the county of Lorain and State of Ohio, have invented new and useful Improvements in Shock Absorbers, of which the following is a specification.

This invention relates to shock absorbers, the general object of the invention being to provide means for resisting the upward movement of the body of the vehicle, the device permitting the body to move downwardly freely.

Another object of the invention is to provide means whereby the device will charge itself with air on the downward movement of the body and also to provide means to check the escape of this air on the upward movement of the body.

The invention also consists in certain other features of construction and in the combination and arrangement of the several parts to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is an enlarged elevation of the device.

Figure 3 is a longitudinal section view.

Figure 1:
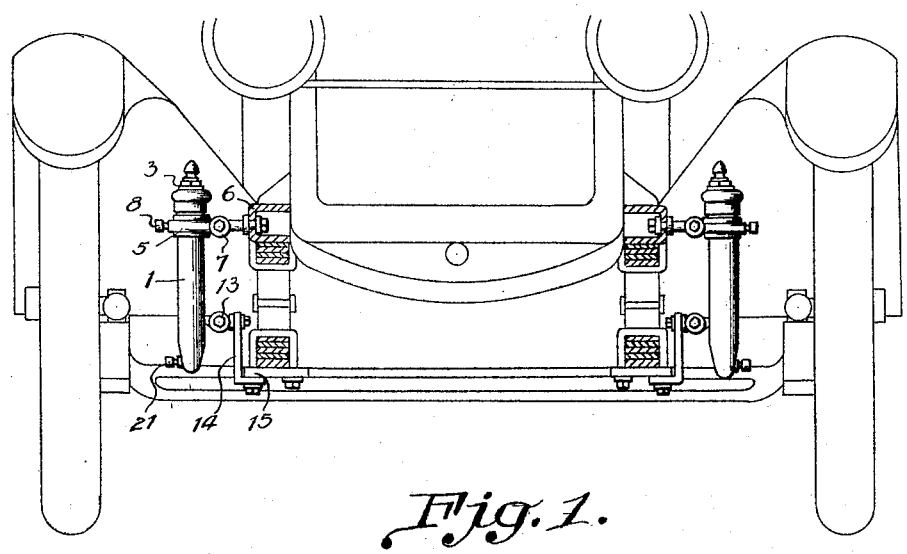
Figure 1 is a front view of an automobile showing my invention in use.
Figure 4:
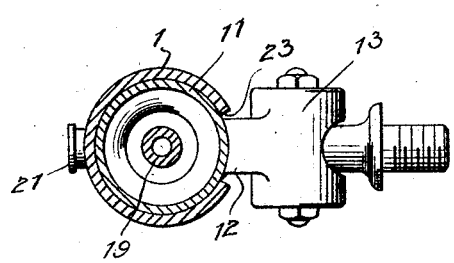
Figure 4 is a section on line 4—4 of Figure 3.
Figure 5:
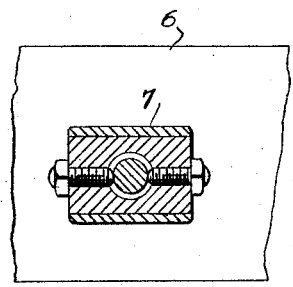
Figure 5 is a section on line 5—5 of Figure 3.

In these views 1 indicates a cylinder which has its upper end threaded to receive a collar 2 of a cap 3, this cap having an airport 4 therein. A collar 5 engages the upper end of the cylinder and is threaded to the threaded part thereof and said collar is fastened to the frame 6 of the automobile by the universal joint 7. A grease cup 8 is carried by the collar, said cup communicating with the groove 9 in the collar, the cylinder having holes 10 therein for permitting the lubricant to pass from the groove into the cylinder. A second cylinder 11 is arranged in the first cylinder, the bottom of the second cylinder having an arm 12 thereon which is connected by the universal joint 13 with the bracket 14 which is connected with the axle 15 of the vehicle. The top 16 of the second cylinder is provided with a small hole 17 for the ingress and egress of air. A piston 18 is arranged in the second cylinder, the hollow piston rod 19 of which passes through the bottom of the second cylinder and is connected with the bottom of the first cylinder as shown in 20. A grease cup or coupling 21 is connected with the hollow piston rod and the upper end of this rod is connected with the passages 22 so that the piston can be lubricated.

From the above it will be seen that the outer cylinder is connected with the body of the car and that the second cylinder is connected with the axle. As the piston is connected with the outer cylinder it will move with said cylinder so that as the car moves downwardly air will be drawn into the inner cylinder by the downward movement of the piston and when the body rebounds this motion will be checked owing to the trapped air in the upper end of the inner cylinder acting against the piston. This air will slowly escape through the hole 17. Thus the device will only work one way as it will charge itself on the downward movement of the body and will act to check the upper movement of the body. In order to allow for this ease of movement in a downward direction, the air contained in the inner cylinder is allowed to leak past the piston 18. However, sufficient air is trapped between this piston 18 and the top 16 as to provide an air cushion upon the rebound of the body.

It is thought from the foregoing description that the advantages and novel features of my invention will be readily apparent.

I desire it to be understood that I may make changes in the construction and in the combination and arrangement of the several parts, providing that such changes fall within the scope of the appended claims.

Having thus described my invention what I claim is:—

A shock absorber comprising a cylinder open at its lower end and provided with a pair of divergent arms and also having a longitudinal slot, a casting supported between the arms and provided with a lubricant passage, a tubular piston rod supported by the casting and arranged within the cylinder and having communication with the lubricant passage, means for supplying lubricant to said passage, a second cylinder slidable within the first mentioned cylinder and provided with a bleed opening at its upper end, an arm extending laterally from the lower end of the last mentioned cylinder and disposed between the walls of the slot and adapted to be operatively connected with part of an automobile suspension spring, and means carried by the upper end of the first mentioned cylinder for connecting the same to a rigid part of an automobile.

In testimony whereof I affix my signature.

CELESTIN LAMPRE.